(12) United States Patent
McGorrin (10) Patent No.: US 7,476,270 B2
(45) Date of Patent: Jan. 13, 2009

(54) INK-JET INK FORMULATIONS CONTAINING MAGNESIUM SULFATE

(75) Inventor: Marlene McGorrin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/669,899

(22) Filed: Jan. 31, 2007

(65) Prior Publication Data

US 2008/0178765 A1    Jul. 31, 2008

(51) Int. Cl.
*C09D 11/02* (2006.01)
*B41J 2/01* (2006.01)

(52) U.S. Cl. ............. 106/31.47; 106/31.48; 106/31.49; 347/100

(58) Field of Classification Search ............. 106/31.27, 106/31.6, 31.49, 31.51, 31.48, 31.47; 347/100
See application file for complete search history.

(56) References Cited

U.S. PATENT DOCUMENTS

| | | | |
|---|---|---|---|
| 5,536,306 A | | 7/1996 | Johnson et al. |
| 5,626,655 A | * | 5/1997 | Pawlowski et al. ........ 106/31.27 |
| 5,695,820 A | | 12/1997 | Davis |
| 6,059,868 A | * | 5/2000 | Kasperchik ............. 106/31.27 |
| 6,350,795 B1 | * | 2/2002 | Breton et al. ............. 523/160 |
| 6,786,955 B2 | | 9/2004 | Kabalnov |
| 6,808,555 B2 | | 10/2004 | Wang et al. |
| 6,824,598 B2 | | 11/2004 | Thornberry |
| 6,841,205 B1 | * | 1/2005 | Sismondi et al. ......... 428/32.27 |
| 6,977,100 B2 | * | 12/2005 | Kondo et al. ............. 428/32.25 |
| 6,991,676 B2 | | 1/2006 | Kabalnov et al. |
| 6,997,978 B2 | | 2/2006 | Kabalnov et al. |
| 7,052,537 B2 | * | 5/2006 | Uhlir-Tsang ............. 106/31.49 |
| 7,199,182 B2 | * | 4/2007 | Tanaka et al. ............. 524/591 |
| 7,204,872 B2 | * | 4/2007 | Uhlir-Tsang ............. 106/31.49 |
| 2001/0012556 A1 | * | 8/2001 | Kondo et al. ............. 428/195 |
| 2002/0135650 A1 | | 9/2002 | Nagia et al. |
| 2003/0103129 A1 | * | 6/2003 | Tanaka et al. ............. 347/105 |
| 2004/0216638 A1 | | 11/2004 | Rolly |
| 2004/0241347 A1 | | 12/2004 | Tsujihata et al. |
| 2005/0104947 A1 | | 5/2005 | Ogino et al. |
| 2005/0157146 A1 | | 7/2005 | Kondo et al. |
| 2005/0221024 A1 | * | 10/2005 | Teshima et al. ............ 428/32.3 |
| 2006/0061640 A1 | | 3/2006 | Doi |
| 2006/0139426 A1 | | 6/2006 | Doi |

FOREIGN PATENT DOCUMENTS

| | | |
|---|---|---|
| EP | 1464685 | 10/2004 |
| EP | 1514913 | 3/2005 |
| GB | 2301845 A * | 12/1996 |
| JP | 09290556 A * | 11/1997 |

OTHER PUBLICATIONS

Abstract of JP 09/290556; Nov. 1997.*

* cited by examiner

*Primary Examiner*—Helene Klemanski (57) ABSTRACT

An ink-jet ink comprises an aqueous liquid vehicle, at least 1% by weight colorant; and a black-to-color bleed control enhancing amount of magnesium sulfate or hydrate thereof.

22 Claims, 2 Drawing Sheets

INK-JET INK FORMULATIONS CONTAINING MAGNESIUM SULFATE

BACKGROUND

In ink-jet technology, image quality of high-resolution images can be a function of both the ink-jet ink used to produce an image and the print medium upon which the image is printed. In ink-jet printing, droplets of ink are ejected from a printhead in response to electrical signals generated by a microprocessor and are deposited on a print medium, such as paper or polymeric substrates, to form the desired image.

When a high-resolution image is printed, major issues arise, namely, color quality and image permanence, i.e., how long the quality of the image will last. With respect to much of the print media currently on the market, printed images commonly exhibit undesirable characteristics relating to image permanence. One such undesirable characteristic is the gradual dye-fade that is sometimes observed when dye-based ink-jet inks are printed on porous media. Such fade is caused by air and, more particularly, by small amounts of ozone in the air. It appears that, over time, ozone reacts with many dyes commonly used in ink-jet inks, causing them to break down and to lose or diminish their intended color properties. It has been observed that when ozone reacts with ink-jet ink dyes, the intended color properties of a given dye may shift to another wavelength value along the visible spectrum. This effect causes a gradual change in the perceived colors of the printed image from what was originally intended, i.e., color-shift. For instance, "red shift" is caused by oxidation of cyan dyes. Existing techniques for mitigating red shift include protecting prints from exposure to the atmosphere, such as by displaying them under glass. Dye-fade and colorshift is more of a problem with certain dyes than with others. Cyan dyes tend to be affected to a greater extent by the presence of ozone in the air than do other dyes.

Some of the drawbacks associated with the use of existing ink-jet inks on conventional print media include bronzing on swellable photo media, bleeding of colors, and stacked haze on porous photo media, among other difficulties. "Bronzing" refers to a lustrous sheen that appears on a printed sample in reflected light, typically appearing as reddish-brown color. It tends to be associated with cyan dyes. Other chemical reactions which detract from the desired color quality can take place in the ink composition during storage. An ink-jet ink composition should be stable and capable of producing the desired color after several months in storage, and for some period of time after first use of the ink and exposure to air.

"Humid hue shift" refers to the tendency of the ink and/or the colorant(s) present in the ink to migrate or spread undesirably into unprinted or printed adjacent areas of the media substrate. Humid hue shift typically occurs prior to the printed inks fully drying on a substrate or after the inks are printed when exposed to humid conditions.

"Image quality" generally refers to the level of defects including, but not limited to, bronzing, humid hue shift and/or bleed of ink-jet printed marks, particularly with colored inks.

Black-to-color bleed is a well recognized problem in the industry. One of the issues confronting formulators of inkjet ink sets comprising black and color (e.g., cyan, yellow, magenta) is that of black-to-color bleed. This has been an issue earlier for dye-based colorants and, more recently, for pigment-based colorants, and most recently for self-dispersed pigment-based colorants.

The term "bleed" as used herein, is defined as follows: When inks of two different colors are printed next to each other, it is desired that the border between the two colors be free from the invasion of one color into the other. When one color does invade into the other, the border between the two colors becomes ragged, and this is bleed. This is in contradistinction to uses of the term in the prior art, which often defines "bleed" in the context of ink of a single color following the fibers of the paper.

The term "halo" applies to the printing defect that occurs in black areas surrounded by color ink. In some cases, a distinct light-gray zone is seen where the black is adjacent to color. The defect is normally seen within 2 to 3 mm from the line dividing the black and color areas and occurs on the black side.

Finally, "mottle" is defined as a color or black non-uniformity on top of the paper, with some areas darker than others.

Dye-based systems, in which the dye colorant is soluble in water, have different considerations than pigment-based systems, in which the pigment colorant is insoluble in water and must be rendered dispersible, such as by the use of polymeric dispersants or by self-dispersing the pigment.

Adding polymers to pigmented systems is well known in the art. Polymers tend to stabilize the dispersion, as well as improve such attributes as the black-to-color bleed, optical density of the black, halo, and mottle. For example, pigmented inks have been disclosed that contain AB and BAB block-copolymers, where the blocks are made out of various monomers of acrylic family. As another example, a relatively high molecular weight (>10,000) polysaccharide such as alginic acid or carrageenan has been used. As another example, the use of polymeric resins, in particular, styrene-acrylic copolymers in pigmented inks is known. Still further, inks containing a carboxylic salt polymer are known. Also, inks containing a copolymer of a hydrophobic $\alpha,\beta$-unsaturated ethylene monomer, and a hydrophilic monomer having a plurality of COOM groups (where M is hydrogen, alkali metal, or an ammonium ion) are known. Specifically, the hydrophobic monomer can be styrene and hydrophilic monomer can be maleic anhydride. In addition, an ink-jet ink containing two dispersants: one containing a sulfonic acid salt/ester, and the other containing a carboxylic acid salt, within a specific range of molecular weights has been described. Finally, a number of polymers for the bleed and halo control are described, most of them being of the acrylic type.

It has been known in the art that introducing chemical reactivity between the color and black inks brings many positive features to ink-jet performance, such as color-to-black bleed control and decreasing the halo. Also, it has been discovered that if reactive color inks are used for underprinting under the black areas, the optical density of the black is improved. The interaction between the polymeric dispersant and polyvalent metal ions in the color inks has been described for controlling bleed/halo/mottle. Alternatively, the reaction with the polymer can be triggered by organic acids in the color inks.

Aside from polymeric dispersants, there is another approach for preparing colloidal pigment dispersions, called self-dispersion. It typically involves attaching solubilizing groups to the pigment. There are several methods known in the art that enable the attachment of a solubilizing ionic group to the surface of a pigment particle. For example, a method of attaching an ionic group to the carbon surface is based on the reactions of diazonium salts. On the other hand, a reaction by oxidation of the surface of the pigment particles may be performed using ozone.

Self-dispersed pigments are much more difficult to control. Developing black-to-color bleed control mechanisms for self-dispersed black pigment inks, such as those available from Cabot Corp., is typically harder than for conventionally dispersed black inks (e.g., using polymeric pigment dispersants) because the self-dispersed pigments are highly electrostatically stabilized. In addition, there is no polymeric dispersant which, when reacted, rapidly builds viscosity and limits ink migration. As an example, a series of polymers of the acrylic type have been used to improve the color-to-bleed and halo of the black pigmented inks. Further improvements are needed for black-to-color-bleed control, especially for self-dispersed black pigment inks.

Bleed Control Agents

The state of the art approach to this black-to-color bleed problem is to add multivalent salts to the dye based color inks that will be printed with the black pigmented inks. The styrene/maleic anhydride polymers in the black ink interact with incompatible multivalent (inorganic or organic) salts in the color, ink. These multivalent salts must be soluble in the ink in the concentration employed. Salts customarily employed in such color inks include nitrate, chloride, acetate, perclorate, formate and thiocyanate salts of calcium and magnesium. The use of salts to control black-to-color bleed in color inks is discussed in U.S. Pat. No. 5,536,306.

One of the issues with respect to the current state-of-the-art approach of modifying dye-based color ink formulations by addition of salts for black-to-color bleed control, is the potential irritancy of the ink. Therefore, a need remains for further improvement of the black to color bleed control using salts that are more environmentally friendly. Ink-jet inks that are more environmentally friendly or "green" would be welcomed by the industry.

SUMMARY

An ink-jet ink in accordance with certain embodiments of the present invention comprises an aqueous liquid vehicle, at least 1% by weight colorant, and a black-to-color bleed control enhancing amount of magnesium sulfate or hydrate thereof.

BRIEF DESCRIPTION OF THE DRAWINGS

For a detailed description of exemplary embodiments of the invention, reference will now be made to the accompanying drawings, in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "comprising, but not limited to . . . ." Likewise, the singular forms "a," "an," and "the" include plural referents unless the context clearly dictates otherwise. Thus, for example, reference to "a dye" includes reference to one or more of such materials.

An "ink" or "ink-jet ink" refers to a liquid solution or dispersion composition that can comprise a liquid vehicle and a colorant, e.g., a dye. The liquid vehicle can be configured to be stable with the dye through a broad range of solution characteristics, and can be configured for ink-jet printing.

As used herein, "liquid vehicle" is defined to include liquid compositions that can be used to carry colorants to a substrate. Liquid vehicles are well known in the art, and a wide variety of ink vehicles may be used in accordance with embodiments of the present invention. Such ink vehicles may include a mixture of a variety of different agents, including without limitation, surfactants, solvents, co-solvents, buffers, biocides, viscosity modifiers, sequestering agents, stabilizing agents, and water. The liquid vehicle can also carry other additives such as polymers, UV curable materials, and/or plasticizers in some embodiments.

"Media substrate" or "substrate" includes any substrate that can receive ink thereon, and can include papers, overhead projector plastics or films, coated papers such as photobase, fabric, art paper such as water color paper, optical disks, or the like.

"Porous medium" refers to any substantially inorganic particulate-containing coated medium having surface voids and/or cavities capable of absorbing the ink-jet inks in accordance with embodiments of the present invention. Typically, porous media include a substrate and a porous ink-receiving layer. As ink is printed on the porous media, the ink fills the voids and the outermost surface can become dry to the touch more quickly than in the case of traditional or "swellable media." Photographs are typically printed on swellable media, which usually has a coating containing inorganic particulates such as metal or semi-metal oxides (e.g., silica or alumina) and polymeric binders, and may include mordants or ionic binding species that attract certain dye species.

The term "about" when referring to a numerical value or range is intended to encompass the values resulting from experimental error that can occur when taking measurements.

Concentrations, amounts, measurements, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, and so forth.

DETAILED DESCRIPTION

Ink-jet Ink compositions, methods for forming printed images, and the resulting printed images are described herein. The inks generally include a colorant, a liquid vehicle, magnesium sulfate or hydrates thereof, and may also include any of a variety of other additives. The inks are suitable for ink-jet printing on any printable media, including plain paper media, porous media, coated media, swellable media and the like.

Many of the ink formulations which contain magnesium sulfate or hydrates thereof as a total or partial replacement of other salts demonstrate equal or improved black-to-color bleed and other print quality performance characteristics such as: improved halo and mottle when printed with black pigmented ink on plain paper. Some embodiments of the new ink formulations employ color inks that are dye-based and black inks that are pigment-based. This approach potentially delivers the best performance for ink-jet printers overall, combining the good text quality and business graphics of the pigmented black inks with the bright colors of the dye-based color inks. Dye-based systems, in which the dye colorant is soluble in water, have different considerations than pigment-based systems, in which the pigment colorant is insoluble in water and must be rendered dispersible, such as by the use of polymeric dispersants or by self-dispersing the pigment.

Various of the ink compositions are suitable for ink-jet printing on a variety of printable media, including porous media, coated media, swellable media, and the like. Many of the new inks are particularly useful for imaging and photo printers, including home and commercial printers. Many of the ink formulations which contain magnesium sulfate or hydrates thereof as a total or partial replacement of other salts typically used for bleed control, demonstrate equal or improved photo image quality on porous media.

Many of the inks are variously suited for printing on inorganic porous particulate coated media (e.g., silica and/or alumina coated media), polymeric swellable media (e.g., hydrophilic polymer or gelatin coated media), or paper substrates, such as plain paper and uncoated paper. Exemplary print media that can be used includes, but is not limited to, Hewlett-Packard Advanced Glossy™ Photo Paper, Ilford Galerie Pearl™ Photo Ink-jet Paper (semi-gloss), Epson Premium Glossy™ Photo Paper, Pictorico Photo Gallery™ glossy paper, and one or more of a variety of plain papers.

Other potential advantages offered by many of the magnesium sulfate-containing inks include milder formulations while maintaining the same or better reliability and performance of the ink, especially when employed for ink jet printing. Still other improvements in ink performance offered by many of the magnesium sulfate-containing inks include decap, nozzle health, pen recovery after storage, ink stability during storage, accelerated storage (ASL), temperature cycle (T-cycle) and freeze/thaw. The magnesium sulfate-containing inks are potentially advantageous for use in environmentally friendly "green" ink formulations.

Magnesium Sulfate.

Magnesium sulfate heptahydrate (CAS No. 10034-99-8) is environmentally friendly. This substance is considered a "minimal risk substance" according to the National Industrial and Occupational Safety and Health Standard (NIOSH), and is "generally recognized as safe" (GRAS) according to 21 CFR184 (FDA). It is widely used commercially in food products and cosmetics. Magnesium sulfate heptahydrate is an "inert ingredient" for US pesticide products and is classified as an inert ingredient "generally regarded as safe" as part of the US EPA list of inert ingredients in pesticide products.

When anhydrous magnesium hydrate or other hydrates of magnesium sulfate are mixed into an aqueous ink-jet ink, they fully hydrate and convert to the environmentally friendly form described above.

The use of magnesium sulfate or hydrates thereof in dye-based ink-jet inks, when substituted for current state of the art ink components used as bleed control agents, potentially provides many benefits. Many of the new inks offer superior performance as a bleed control agent. Occupational exposure to inks made with magnesium sulfate constitutes minimal risk. Magnesium sulfate is also a minimal risk compound with respect to environmental concerns. Magnesium sulfate constitutes a minimal risk with respect to end of life disposition of ink-jet pens and printers, media printed with these inks, and the like. The use of magnesium sulfate as a bleed control agent potentially offers favorable classification, labeling, and distribution of ink-jet ink, ink-jet cartridges containing ink-jet ink, and the like. Due to the nature of aqueous ink-jet inks, the use of magnesium sulfate to make an environmentally friendly aqueous ink-jet ink component is potentially highly beneficial.

In one embodiment of the new ink-jet inks, anhydrous magnesium sulfate (CAS No. 7487-88-9) is added to a cyan dye-based color ink between 0.5 and 4.5% by total ink weight, replacing current state-of-the-art salts typically used to control black-to-color bleed, halo, and mottle when printed with a black pigment ink.

In one embodiment, magnesium sulfate monohydrate (CAS No. 14168-73-1), is added to a cyan dye-based color ink between 0.5 and 4.0% totally replacing current state-of-the-art salts typically used for black-to-color bleed control.

In another embodiment, 0.1 and 5.0% by total ink weight magnesium sulfate heptahydrate (CAS No. 10034-88-9), and 0.1-5.0% magnesium nitrate hexahydrate are added to a cyan dye-based color ink, partially replacing current state-of-the-art salts typically used for black-to-color bleed control.

In another ink embodiment, magnesium sulfate heptahydrate (CAS No. 10034-99-8) is added to a magenta dye-based color ink between 0.1 and 5.0% partially replacing current state-of-the-art salts typically used for black-to-color bleed control.

In still another embodiment, magnesium sulfate heptahydrate (CAS No. 10034-99-8) is added to a yellow dye-based color ink between 0.1 and 5.0% partially replacing current state-of-the-art salts typically used for black-to-color bleed control.

Ink Composition

The magnesium sulfate-containing ink compositions are typically prepared in an aqueous formulation or liquid vehicle that can include water, colorants, co-solvents, surfactants, buffering agents, biocides, sequestering agents, viscosity modifiers, humectants, binders, and/or other known additives.

Vehicle.

The liquid vehicle may comprise from about 70 wt % to about 99.9 wt % by weight of the ink composition, for example. The vehicle for the ink may comprise an aqueous-based vehicle that includes water or a mixture of water and at least one water-soluble organic solvent. Selection of a suitable mixture depends on requirements of the specific application, such as desired surface tension and viscosity, the selected colorant, drying time of the liquid, and the type of substrate onto which the liquid will be printed. Some water-soluble organic solvents that may be selected for use in the present inks are described in U.S. Pat. No. 5,085,698, the disclosure of which is hereby incorporated by reference.

Co-solvents.

One or more solvent or co-solvents may be included in the ink formulation in a total amount generally ranging from about 1% (wt %) to about 50%; from about 2 to about 45 wt %, or from about 5 to about 35 wt %. Suitable co-solvents include, but are not limited to, water soluble organic co-solvents, aliphatic alcohols, aromatic alcohols, diols, glycol ethers, poly(glycol) ethers, N-alkyl caprolactams, unsubstituted caprolactams, both substituted and unsubstituted formamides, both substituted and unsubstituted acetamides, long chain alcohols, ethylene glycol, propylene glycol, diethylene glycols, triethylene glycols, glycerin, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, co-solvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, and the like. Specific examples of co-solvents that are preferably employed in the practice of this invention include, but are not limited to, 1,6-hexanediol, 1,5-pentanediol, 2-pyrrolidinone, 1,2-(hydroxylethyl)-2-pyrrolidinone, trimethylolpropane (EHPD), and tetraethylene glycol.

Selected co-solvents can be added to reduce or enhance the rate of evaporation of water in the ink-jet to minimize clogging or other properties of the ink such as viscosity, pH, surface tension, optical density, and print quality, as desired. Multiple co-solvents can also be used, as is known in the art. An example of an ink vehicle formulation usable in formulating an ink includes one or more solvent or co-solvents, in a (total) amount in the range of about 1% (wt %) to about 50%; from about 2 to about 45 wt %, or from about 5 to about 35 wt %.

Additional Bleed Control Agents.

In some embodiments, additional bleed control agents are included in an amount comprising up to about 5 wt % of the ink-jet ink composition. Additional suitable bleed control agents consist of calcium nitrate, calcium chloride, calcium acetate, magnesium nitrate, magnesium chloride, magnesium acetate, and combinations of any of those or other salts.

Buffering Agents.

Various buffering agents or pH adjusting agents may also be selected for inclusion in the ink-jet ink compositions. Typical buffering agents include such pH control solutions as Trizma Base, available from Sigma-Aldrich Corp. (Milwaukee, Wis.); 4-morpholine ethane sulfonic acid ("MES"); 4-morpholinepropanesulfonic acid ("MOPS"); and beta-hydroxy-4-morpholinepropane-sulfonic acid ("MOPSO"); hydroxides of alkali metals and amines, such as lithium hydroxide, sodium hydroxide, potassium hydroxide; citric acid, nitric acid, hydrochloric acid, acetic acid, sulfuric acid; amines such as triethanolamine, diethanolamine, and dimethylethanolamine and other basic or acidic components. If used, buffering agents, typically comprise up to about 10 wt % of the ink-jet ink composition.

Other Additives.

Various types of additives, may be employed in the inks (or the performance optimizing liquid vehicle) to optimize the properties of the ink compositions for specific applications. The remainder of the ink composition is mostly water; however, other independently selected components may be included in some embodiments, including: surfactants, humectants, anti-kogation additives, anti-corrosive additives, polymers, preservatives, biocides that inhibit growth of microorganisms (such as the preservative PROXEL™ GXL available from Avecia Incorporated); chelating agents (or sequestering agents) such as EDTA that eliminate deleterious effects of heavy metal impurities; and viscosity modifiers, which may be added to improve various properties of the ink composition.

In an embodiment, at least one of the inks (e.g., a cyan ink), may further include a phenylenediamine compound having the CA Index name Ethanesulfonic acid, 2,2'-[1,3-phenylenebis[imino[6-[bis(2-hydroxyethyl)amino]-1,3,5-triazine-4,2-diyl]imino]]bis-, disodium salt. The presence of the phenylenediamine compound acts as a anti-flocculant reducing the unwanted aggregation of the dyes in the ink. In an embodiment, the diphenylamine additive improves the quality of the printed images, in particular on swellable media by reducing coalescence and bronzing of the ink on the printing medium. This phenylenediamine compound is further described in European Patent Publication EP1514913A2. In an embodiment, when present, the phenylenediamine compound may be added to each ink in an amount generally ranging from about 0.2 to about 10%, from about 0.5 to about 5%, from about 1.5 to about 2.5%, by weight, based on the total weight of the ink (with the wt % numbers for the phenylenediamine compound corrected for the % active ingredients).

Surfactants. One or more surfactants can be included in an ink formulation, such suitable alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like, as well as fluorocarbon surfactants such as those formed at least in part from a polymer made based on oxetane chemistry having the structure Wherein
Q$_1$ and Q$_2$ are independently selected from the group consisting of H, SO$_3^-$W$^+$, COO$^-$W$^+$, and COOH and wherein W is selected from the group consisting of NH$_4$, Li, Na, and K;
R$_1$ and R$_2$, are independently selected from the group consisting of H and OH;
R$_4$, and R$_5$ are independently selected from the group consisting of O(CH$_2$)$_m$—(CF$_2$)$_n$—CF$_3$ wherein m=1-3 and n=0-3;
R$_3$ is selected from the group consisting of (CH$_2$)$_L$ and and
L=1-4; x=1-10; y=1-30; and z=1-10.
In an embodiment, the oxetane-based fluorocarbon surfactant is formed from at least a polymeric material having L=4; m=1; n=1; and R$_2$ and R$_4$=H.

Examples of suitable oxetane-based fluorocarbon surfactants include, but are not limited to those generally available from companies such as Omnova Solutions, Inc. of Fairlawn, Ohio under the trade name of PolyFox® fluorocarbon surfactants. Exemplary PolyFox® surfactants include PolyFox PF-136A, PolyFox PF-151N, PolyFox PF-154N, and Poly-Fox PF-156A, PolyFox AT-1121.

Examples of nonionic and amphoteric surfactants include TERGITOL® compounds, which are alkyl polyethylene oxides available from Dow Chemical (Midland, Mich.); TRITON® compounds, which are alkyl phenyl polyethylene oxide surfactants available from Rohm & Haas Co. (Philadelphia, Pa.); BRIJ® compounds available from ICI Americas (Wilmington, Del.); PLURONIC® compounds, which are polyethylene oxide/polypropylene oxide block copolymers; SURFYNOL® compounds, which are acetylenic polyethylene oxides available from Air Products (Allentown, Pa.); anionic surfactants such as members of the DOWFAX™ family of diphenyl sulfonate derivatives available from the Dow Chemical Company, and the CRODAFOS™ family of phosphate esters available from Croda Incorporated; polyethylene oxide ("POE") esters; POE diesters; POE amines; POE amides; and dimethicone copolyols.

Colorants.

Colorants employed in many of the magnesium sulfate-containing ink compositions are dyes, such as are known. With respect to the various ink-jet ink dyes, any suitable cationic dye or anionic dye can be used. One representative anionic dye is a chromophore having a pendent anionic group. Though any effective amount of dye can be used, preferably, the anionic dye is present in the ink composition in an amount in the range of about 0.1 wt % to about 10 wt %.

Examples of suitable anionic dyes that can be used include but are not limited to a large number of water-soluble acid and direct dyes. Specific examples of anionic dyes include: Direct Yellow 86, Direct Yellow 132, Acid Red 249, Direct Blue 199, Direct Black 168, Reactive Black 31, Direct Yellow 157, Reactive Yellow 37, Acid Yellow 23, Reactive Red 180, Acid Red 52, Acid Blue 9, Direct Red 227, Acid Yellow 17, Direct Blue 86, Reactive Red 4, Reactive Red 56, Reactive Red 31, and Direct Yellow 132; Aminyl Brilliant Red F-B (Sumitomo Chemical Co.); the Duasyn line of "salt-free" dyes available from Hoechst; mixtures thereof; and the like. Further examples include Bernacid Red 2BMN, Pontamine Brilliant Bond Blue A, BASF X-34, Pontamine, Food Black 2, Levafix Brilliant Red E-4B (Mobay Chemical), Levafix Brilliant Red E-6BA (Mobay Chemical), Pylam Certified D&C Red #28 (Acid Red 92, Pylam), Direct Brill Pink B Ground Crude (Crompton & Knowles), Cartasol Yellow GTF Presscake (Sandoz, Inc.), Tartrazine Extra Conc. (FD&C Yellow #5, Acid Yellow 23, Sandoz, Inc.), Cartasol Yellow GTF Liquid Special 110 (Sandoz, Inc.), D&C Yellow #10 (Yellow 3, Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Aizen Spilon Yellow C-GNH (Hodagaya Chemical Company), Spirit Fast Yellow 3G, Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI Americas), Morfast Black Conc A (Morton-Thiokol), Diazol Black RN Quad (ICI Americas), Orasol Blue GN (Ciba-Geigy), Savinyl Blue GLS (Sandoz, Inc.), Luxol Blue MBSN (Morton-Thiokol), Sevron Blue 5GMF (ICI Americas), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer; Procion Turquoise PA, Procion Turquoise HA, Procion Turquoise Ho5G, Procion Turquoise H-7G, Procion Red MX-5B, Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, all available from ICI Americas; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E-6B, all available from BASF; Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, Intracron Turquoise Blue GE, Intracron Turquoise HA, and Intracron Black RL, all available from Crompton and Knowles, Dyes and Chemicals Division; Pro-Jet 485 (a copper phthalocyanine); Magenta 377; Yellow 1189; mixtures thereof, and the like. This list is intended to be merely exemplary, and should not be considered limiting. Similarly, a large range of cationic dyes can be used.

Alternatively, any other suitable dyes may be employed in the present magnesium sulfate-containing inks. Certain dyes are described in contemporaneously filed co-owned U.S. patent application Ser. No. 11/701,332 titled "Magenta Inks and Ink Sets for Ink-Jet Imaging," the disclosure of which is hereby incorporated herein by reference. It has been found that black-to-color bleed, halo, and mottle when printed with a black pigment ink on plain paper, and image quality, humid hue shift and poor stacking performance on porous media, that are drawbacks of many conventional ink-jet inks are potentially reduced by inclusion in the ink of an effective amount of magnesium sulfate (i.e., in the range of about 0.1 to 10.0 wt %). This can be done in combination with decreasing or entirely eliminating other salts typically used for bleed control in the ink formulation.

EXAMPLES

Examples of the new ink compositions are set forth below. These Examples are merely illustrative and are not intended to limit the claims in any way.

The ink-jet ink may be cyan, magenta, yellow, or any other color, depending on the colorant(s) selected. Each ink may include one or more colorant at independently selectable concentrations, hues, values, and chromas. The pHs of the inks are adjusted, as necessary with any of a wide variety of suitable pH adjustors such as potassium hydroxide or nitric acid, according to the specific pH requirements of the ink.

The dyes or other colorants in the inks of the present invention are present in amounts in the range of about 0.1 wt % to about 10 wt %. In some embodiments, they range from about 0.5 wt % to about 8 wt %, and in still other embodiments, the dyes or other colorants range from about 1 wt % to about 6 wt %, based on the total weight of the ink. It is noted that the amounts of dye(s) present in each of the inks is independent for each dye and for each ink. For example, a magenta dye might contain 3.5 wt % of Formula 1 and 2 wt % of Formula 2, or the cyan ink might have 4 wt % Formula 3). Dye Formulas 1-5 are described in more detail below.

The presence of an anti-flocculant phenylenediamine compound can act as an anti-flocculant, reducing unwanted aggregation of the dyes in the ink(s). In one embodiment, the phenylenediamine additive improves the quality of the printed images, in particular on swellable media, by reducing coalescence and bronzing of the ink on the printing medium. In some embodiments, a phenylenediamine compound is added to the ink in an amount generally ranging from about 0.2 to about 14 wt %, from about 1 wt % to about 13 wt %, or from about 1.5 to about 12 wt %, based on the total weight of the ink.

General Formulation Method.

Figure 1:
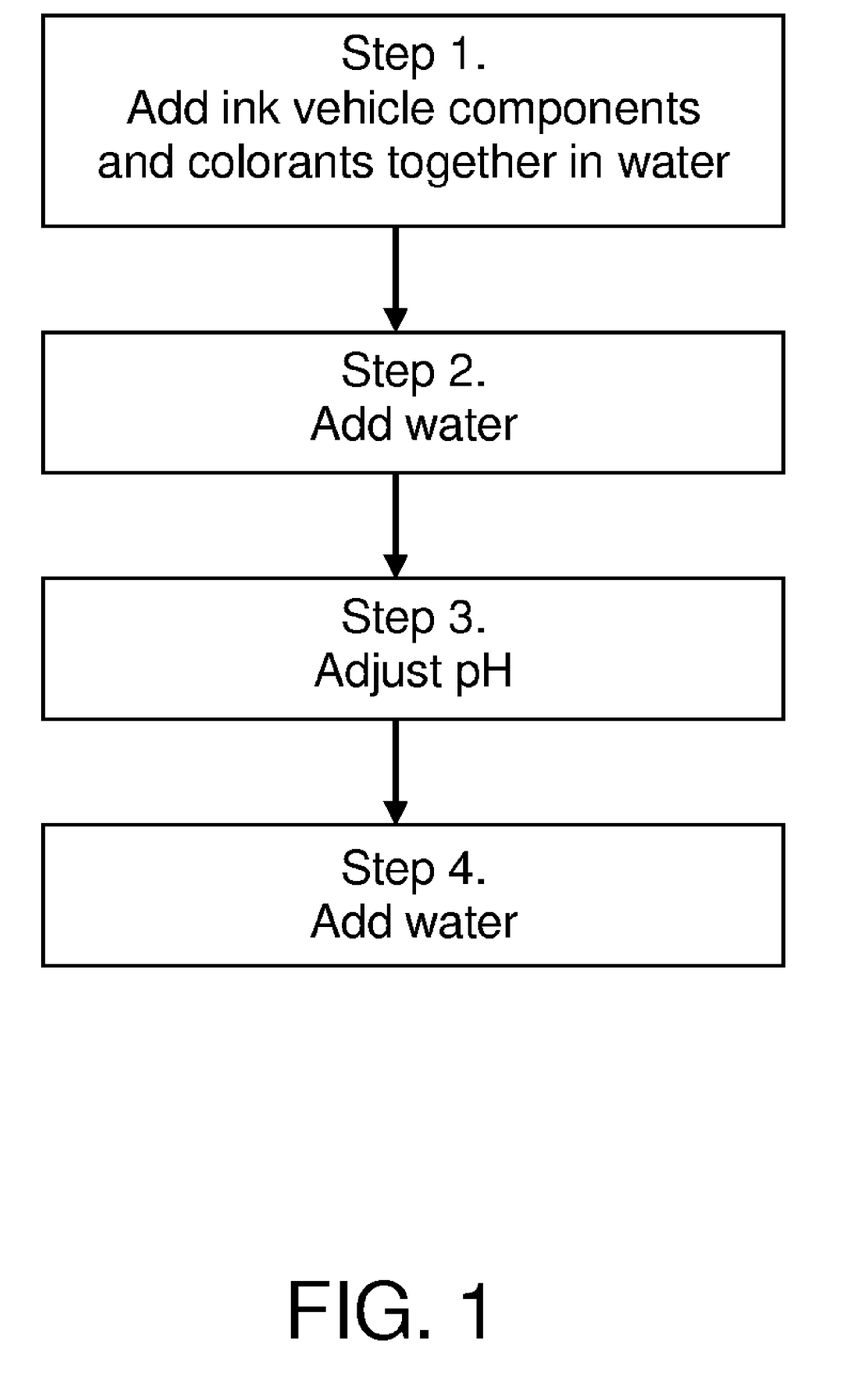
FIG. 1 is a flow diagram showing the process for forming an ink-jet ink composition, in accordance with an embodiment of the present invention.

As shown in FIG. 1, according to an exemplary method the above-mentioned components are combined to form an ink-jet ink by first adding (step 1) all of the ink vehicle components (including the magnesium sulfate) and colorants to water and mixing. Additional water may then be added (step 2) to the components.

Once the ink formulation is formed, as described above, the pH of the ink formulation is then adjusted, if necessary, (step 3) to be in the range of approximately 5.5 to 8.5, by adding a pH adjustor such as potassium hydroxide or nitric acid according to the specific pH requirements of the ink. The remainder of the water is subsequently added (step 4).

The resulting ink-jet ink compositions can be placed into one or more ink-jet pens, as is known in the art. For example, the ink-jet ink may be incorporated into any type of ink-jet material dispenser including, but not limited to, thermally actuated ink-jet dispensers, mechanically actuated ink-jet, dispensers, electrostatically actuated ink-jet dispensers, magnetically actuated dispensers, piezoelectrically actuated dispensers, continuous ink-jet dispensers, and similar devices. Alternatively, the present ink-jet ink may be dispensed from non-ink-jet sources including, but not limited to, screen printing apparatus, stamping apparatus, pressing apparatus, gravure printing apparatus, and the like.

The following examples illustrate various aspects of the inks in accordance with embodiments of the present invention. These examples should not be considered as limitations of the invention, but should merely teach how to make inks representative of the present invention. In general, these exemplary formulas provide the following enhancements to the ink. When the ink comprises an amount of magnesium sulfate in the range of about 0.1 to 10 wt % the following enhancements to the ink are potentially provided: improved print quality, increased decap time, pen reliability, environmental robustness of ink in pen, and environmental robustness of printed ink on media.

Dyes

Magenta Dyes. An exemplary colorant for use in some of the new inks for use in ink-jet printing includes a first magenta dye and a second magenta dye. The first magenta dye has the structure of Formula 1:

FORMULA 1

In Formula 1, $R^{21}$, $R^{23}$, $R^{25}$, $R^{27}$, $R^{29}$ and $R^{31}$, are independently a hydrogen atom or a sulfonate group, $R^{22}$ is a hydrogen atom or a nitro group, $R^{26}$ and $R^{28}$ are independently a hydrogen atom or a methyl group, $R^{24}$ and $R^{30}$ are independently a methyl or sulfonate group, and $R^{32}$ is a methyl or a methoxy group.

In one embodiment, in Formula 1, $R^{21}$, $R^{23}$, $R^{27}$, and $R^{31}$ can be sulfonate groups; $R^{22}$, $R^{25}$, and $R^{29}$ can be hydrogen atoms; and $R^{24}$, $R^{26}$, $R^2$, $R^{30}$, and $R^{32}$ can be methyl groups. In another embodiment, the sulfonate group can be a salt of lithium, sodium, potassium, ammonium, tetramethylammonium, or a mixture thereof. In still another embodiment, the sulfonate group can be a salt of potassium.

The second magenta dye can have the structure of Formula 2:

FORMULA 2 and salts thereof, wherein Q is lithium, potassium, sodium, ammonium, tetramethylammonium, or a mixture thereof.

Formula 2 above is shown in acid form, but it is noted that this can also be used in salt form, including but not limited to a salt of sodium or ammonium. In addition to these two types of dyes, other magenta and non-magenta dyes can also be present in the magenta ink-jet ink.

Cyan Dyes. An ink for use in ink-jet printing can comprise one or more cyan, magenta, or yellow ink (colored ink) that includes at least one salt, which, when the colored ink contacts a black ink, causes the black self-dispersed pigment to precipitate, thereby helping to alleviate black to color bleed. The cyan ink that can be used includes a dye with the structure of Formula 3:

FORMULA 3 where M represents a hydrogen atom or a metal atom (or an oxide, hydroxide, or halide thereof), and $P_c$ represents a phthalocyanine nucleus. $R^1$ and $R^2$ each independently represent a substituent selected from the group of —$SOX^1$, —$SO_2X^1$, $SO_2NX^2X^3$, —$SO_3X^4$, where $X^1$, $X^2$, $X^3$, and $X^4$ each independently represents a hydrogen atom, a substituted or unsubstituted alkyl group, a substituted or unsubstituted aryl group, or a substituted or unsubstituted heterocyclic group. At least one of $R^1$ or $R^2$ has an ionic hydrophilic group as a substituent. Additionally, k and l each independently represents an integer ranging from 1 to 3. Typically, k and l each independently is selected such that k+l equals 4. Additionally, $R^1$ can be —SO—$(CH_2)_3$—$SO_3Z$ or —$SO_2$—$(CH2)_3$—$SO_3Z$; and/or $R^2$ can be —$SO_2$—$(CH_2)_3$—$SO_2NH$—$C_2H_4OC_2H_4OH$ or —$SO_2$—$(CH_2)_3$—$SO_2NH$—$CH_2CH(OH)CH_3$. In these embodiments, Z can be lithium, sodium, potassium, ammonium, tetramethylammonium, or a mixture thereof. In yet another embodiment, Z can be lithium or potassium. In a further embodiment, Z can be lithium. In one specific embodiment, $R^1$ can be —$SO_2$—$(CH2)_3$—$SO_3Z$, $R^2$ can be —$SO_2$—$(CH_2)_3$—$SO_2NH$—$CH_2CH(OH)CH_3$, k can be 3, and Z can be lithium.

The cyan ink can also include additional dyes or colorants. In one embodiment, the cyan ink further includes at least one additional dye, such as Direct Blue 199 (DB199), Direct Blue 86 (DB86), Direct Blue 87 (DB87), Direct Blue 307 (DB307), or Acid Blue 9 (AB9). In another embodiment, the cyan ink includes AB9, or the sodium or lithium salt of AB9. In another embodiment, the AB9 is added to the cyan ink in an amount of from about 0.01 to about 1 wt %, from about 0.05 to about 0.5 wt %, or from about 0.07 to about 0.4 wt %.

Table I below, provides exemplary phthalocyanine dyes in which the substituents $R^1$ and $R^2$ are each introduced at the β-position. However, it should be appreciated by those skilled in the art, that although one exemplary dye has the R substituent at the β-position, the dye and the ink containing the same can further include the same basic nucleus with the R substituent at different positions such as the α-position. In the exemplary dyes shown in Table I, M is copper (Cu).

TABLE I

| Cyan Dye | $R_1$ | k | $R_2$ | l |
|---|---|---|---|---|
| C1 | —SO—$(CH_2)_3$—$SO_3K$ | 3 | —$SO_2$—$(CH_2)_3$—$SO_2NH$—$C_2H_4OC_2H_4OH$ | 1 |
| C2 | —$SO_2$—$(CH2)_3$—$SO_3K$ | 2 | —$SO_2$—$(CH_2)_3$—$SO_2NH$—$C_2H_4OC_2H_4OH$ | 2 |
| C3 | —$SO_2$—$(CH2)_3$—$SO_3Li$ | 3 | —$SO_2$—$(CH_2)_3$—$SO_2NH$—$CH_2CH(OH)CH_3$ | 1 |
| C4 | —$SO_2$—$(CH2)_3$—$SO_3Li$ | 2.7 | —$SO_2$—$(CH_2)_3$—$SO_2NH$—$CH_2CH(OH)CH_3$ | 1.3 |
| C5 | —$SO_2$—$(CH2)_3$—$SO_3Li$ | 2 | —$SO_2$—$(CH_2)_3$—$SO_2NH$—$CH_2CH(OH)CH_3$ | 2 |

A variety of additional salts can be used in the above embodiment in order to cause the pigment in a black ink to precipitate when the pigment contacts the salt on a media substrate. The precipitation can occur when a self-dispersing pigment in the black ink interacts with multivalent (inorganic or organic) salts present in at least one of the color (e.g., cyan, magenta, yellow) inks. In some embodiments, additional bleed control agents are included in an amount comprising up to about 5 wt % of the ink-jet ink composition. Additional suitable bleed control agents consist of calcium nitrate, calcium chloride, calcium acetate, magnesium nitrate, magnesium chloride, magnesium acetate, and combinations of any of those.

Yellow Inks. Still another type of colorant that can be used in an ink-jet ink includes least one azo yellow dye, one of which has the structure of Formula 4:

FORMULA 4

Anti-flocculant. Various of the new ink-jet inks further include an anti-flocculant material, such as a phenylenediamine compound having the structure of Formula 5:

FORMULA 5

In Formula 5, above, this compound can be a salt where M is a monovalent cation, such as, but not limited to, lithium or sodium. Any other suitable dye may be included in an ink to which magnesium sulfate is added.

A number of ink performance improvements are observable with many formulations of ink containing magnesium sulfate, when they are employed for ink-jet printing, compared to many of the ink compositions in commercial use today. Various performance improvements include: decreased humid hue shift, and improved image quality on porous photo media; improved decap, nozzle health and pen recovery after storage; and black-to-color bleed, halo, and mottle when printed with a black pigment ink on plain paper. Still other improvements with many of the new ink formulations include greater ink stability during storage, and improved ASL, T-Cycle and Freeze/Thaw characteristics, and the benefit of more environmentally friendly ink-jet ink. In many ink compositions, an effective amount of magnesium sulfate is in the range of about 0.1 to 10 wt % (by weight of total ink weight), and some ink compositions the is about 0.1 to 5 wt %. In still other embodiments, the range is 0.2 wt % to about 6.0 wt % of the total ink formulation.

EXAMPLES

Examples of the improved ink compositions are set forth below. These Examples are merely illustrative and are not intended to limit the claims in any way.

Example I

Cyan A

An ink-jet ink is prepared according to Example I as follows:

| Materials | Wt % |
| --- | --- |
| 1-(2-hydroxyethyl)-2-pyrrolidinone | 2.0-6.0% |
| 1-5 pentanediol | 2.0-7.0% |
| EHPD | 5.0-9.8% |
| 1,6-hexanediol | 0.5-4.0% |
| Imidazole or Trizma base | 0.1-2.0% |
| Surfactant | 0.1-3.0% |
| EDTA | 0.05-0.5% |
| Magnesium sulfate heptahydrate | 2.0-7.0% |
| Biocide | 0.01-0.3% |
| Cyan Dye of Formula 3 | 2.0-5.0% |

| Materials | Wt % |
| --- | --- |
| Anti-flocculant of Formula 5 | 2.0-14.0% |
| Water | Balance |
| TOTAL | 100.00 |
| pH | 6.0-8.5 |

This ink contains 2.0-7.0% by total ink weight magnesium sulfate heptahydrate (CAS No. 10034-88-9), 2.0-5.0% cyan dye of Formula 3, and an anti-flocculant of Formula 5, in the range of 2.0-14 wt %. In this example, magnesium sulfate heptahydrate can be added as appropriate to control black-to-color bleed, halo, and mottle when printed with a black pigment ink.

Example II

Cyan B

An ink-jet ink is prepared according to Example II as follows:

| Materials | Wt % |
| --- | --- |
| 1-(2-hydroxyethyl)-2-pyrrolidinone | 2.0-6.0% |
| 1-5 pentanediol | 2.0-7.0% |
| EHPD | 5.0-9.8% |
| 1,6-hexanediol | 0.5-4.0% |
| Imidazole or Trizma base | 0.1-2.0% |
| Surfactant | 0.1-3.0% |
| EDTA | 0.05-0.5% |
| Magnesium sulfate heptahydrate | 0.1-5.0% |
| Magnesium nitrate hexahydrate | 0.1-5.0% |
| Biocide | 0.01-0.3% |
| Cyan Dye of Formula 3 | 2.0-5.0% |
| Anti-flocculant of Formula 5 | 2.0-14.0% |
| Water | Balance |
| TOTAL | 100.00 |
| pH | 6.0-8.5 |

This ink contains 0.1-5.0% by total ink weight magnesium sulfate heptahydrate (CAS No. 10034-88-9), 0.1-5.0% magnesium nitrate hexahydrate, 2.0-5.0% cyan dye of Formula 3, and an anti-flocculant of Formula 5, in the range of 2.0-14 wt %. In this example, a combination of two sources of multivalent ions can be added as appropriate to control black-to-color bleed, halo, and mottle when printed with a black pigment ink.

Example III

Cyan C

An ink-jet ink is prepared according to Example III as follows:

| Materials | Wt % |
| --- | --- |
| 1-(2-hydroxyethyl)-2-pyrrolidinone | 2.0-6.0% |
| 1-5 pentanediol | 2.0-7.0% |
| EHPD | 5.0-9.8% |

-continued

| Materials | Wt % |
| --- | --- |
| 1,6-hexanediol | 0.5-4.0% |
| Imidazole or Trizma base | 0.1-2.0% |
| Surfactant | 0.1-3.0% |
| EDTA | 0.05-0.5% |
| Magnesium sulfate (anhydrous) | 0.5-4.5% |
| Biocide | 0.01-0.3% |
| Cyan Dye of Formula 3 | 2.0-5.0% |
| Anti-flocculant of Formula 5 | 2.0-14.0% |
| Water | Balance |
| TOTAL | 100.00 |
| pH | 6.0-8.5 |

This ink contains 0.5-4.5% by total ink weight anhydrous magnesium sulfate (CAS No. 7487-88-9), 2.0-5.0% cyan dye of Formula 3, and an anti-flocculant of Formula 5, in the range of 2.0-14 wt %. In this example, anhydrous magnesium can be added as appropriate to control black-to-color bleed, halo, and mottle when printed with a black pigment ink.

Example IV

Cyan D

An ink-jet ink is prepared according to Example IV as follows:

| Materials | Wt % |
| --- | --- |
| 1-(2-hydroxyethyl)-2-pyrrolidinone | 2.0-6.0% |
| 1-5 pentanediol | 2.0-7.0% |
| EHPD | 5.0-9.8% |
| 1,6-hexanediol | 0.5-4.0% |
| Imidazole or Trizma base | 0.1-1.0% |
| Surfactant | 0.1-3.0% |
| EDTA | 0.05-0.5% |
| Magnesium sulfate monohydrate | 0.5-4.0% |
| Biocide | 0.01-0.3% |
| Cyan Dye of Formula 3 | 2.0-5.0% |
| Cyan Dye AB9 | 0.1-1.0% |
| Anti-flocculant of Formula 5 | 2.0-14.0% |
| Water | Balance |
| TOTAL | 100.00 |
| pH | 6.0-8.5 |

This ink contains 0.5-4.0% by total ink weight magnesium sulfate monohydrate (CAS No. 14168-73-1), 2.0-5.0% cyan dye of Formula 3, 0.1-1.0% cyan dye AB9, and an anti-flocculant of Formula 5, in the range of 2.0-14 wt %. In this example, magnesium sulfate monohydrate can be added as appropriate to control black-to-color bleed, halo, and mottle when printed with a black pigment ink.

Example V

Magenta A

Another ink-jet ink is prepared according to Example V as follows:

| Materials | Wt % |
| --- | --- |
| 2-pyrrolidinone | 0-5.0% |
| 1-5 pentanediol | 3.0-8.0% |
| EHPD | 0-5.0% |
| 1,6-hexanediol | 5.0-15.0% |
| Surfactant | 0.1-3.0% |
| MOPS or MES | 0.05-1.0% |
| EDTA | 0.05-0.5% |
| Magnesium sulfate heptahydrate | 0.1-5.0% |
| Magnesium nitrate hexahydrate | 0.1-5.0% |
| Biocide | 0.01-0.3% |
| Magenta Dye of Formula 1 | 2.0-5.0% |
| Magenta Dye of Formula 2 | 0.5-2.5% |
| Anti-flocculant of Formula 5 | 0-14.0% |
| Water | Balance |
| TOTAL | 100.00 |
| pH | 7.0-7.5 |

This ink contains 0.1-5.0% by total ink weight magnesium sulfate heptahydrate (CAS No. 10034-88-9), 0.1-5.0% magnesium nitrate hexahydrate, 2.0-5.0% magenta dye of Formula 1, 0.5-2.5% magenta dye Formula 2, and an anti-flocculant of Formula 5, in the range of 0-14 wt %. In this example, a combination of two sources of multi-valent ions can be added as appropriate to control black-to-color bleed, halo, and mottle when printed with a black pigment ink.

Example VI

Yellow A

Another ink-jet ink is prepared according to Example VI as follows:

| Materials | Wt % |
| --- | --- |
| 2-pyrrolidinone | 0.2-6.0% |
| 1-5 pentanediol | 2.0-7.0% |
| EHPD | 5.0-10.0% |
| 1,6-hexanediol | 0.5-4.0% |
| Surfactant | 0.1-3.0% |
| MOPS or MES | 0.05-1.0% |
| EDTA | 0.05-0.5% |
| Magnesium sulfate heptahydrate | 0.1-5.0% |
| Magnesium nitrate hexahydrate | 0.1-5.0% |
| Biocide | 0.01-0.3% |
| Yellow Dye of Formula 4 | 2.0-5.0% |
| Anti-flocculant of Formula 5 | 0-14.0% |
| Water | Balance |
| TOTAL | 100.00 |
| pH | 6.0-7.5 |

This ink contains 0.1-5.0% by total ink weight magnesium sulfate heptahydrate (CAS No. 10034-88-9), 0.1-5.0% magnesium nitrate hexahydrate, 2.0-5.0% yellow dye of Formula 4, and an anti-flocculant of Formula 5, in the range of 0-14 wt %. In this example, a combination of two sources of multivalent ions can be added as appropriate to control black-to-color bleed, halo, and mottle when printed with a black pigment ink.

In another embodiment, an ink-jet ink comprises a non-aqueous liquid vehicle (e.g., alcohol), at least 1% by weight colorant, and an amount of magnesium sulfate, or hydrate thereof, sufficient to enhance black-to-color bleed control of the ink.

In another embodiment, an ink-jet ink set includes an ink-jet ink comprising a colorant containing at least one pigment in an aqueous liquid, and a fixative solution comprising magnesium sulfate or a hydrate thereof in a second aqueous liquid. In the fixative solution colorants are omitted. The fixative solution is formulated to fix the ink-jet ink when the ink and the fixative solution come in contact with each other upon being printed by an ink-jet printer.

Process

Figure 2:
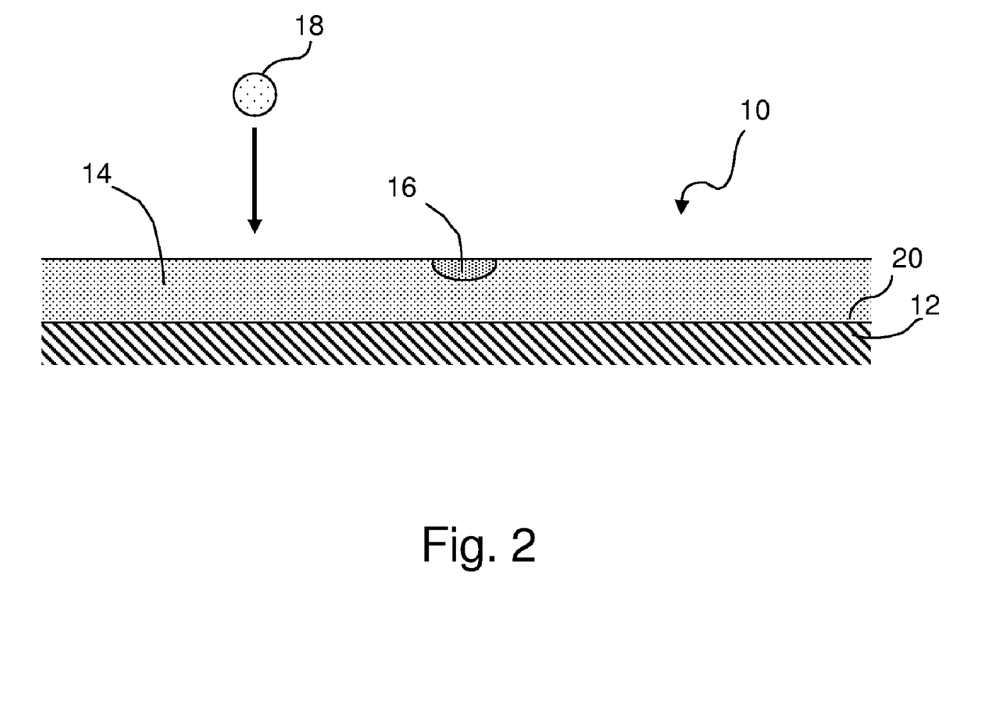
FIG. 2 is a schematic illustration of a printed medium comprising a magnesium sulfate-containing ink jet ink, in accordance with an embodiment of the present invention.

Referring to FIG. 2, there is shown a representative print medium 10 comprising a substrate layer 12 having a surface 20 that is, optionally coated with a porous or swellable ink-receiving layer or coating 14. Substrate 12 can be paper, plastic, coated paper, fabric, art paper, optical disks, or another known substrate such as is used in the ink-jet printing arts. When it is desired to make a mark using an above-described ink, an ink droplet 18 is applied (e.g., via an ink-jet printer (not shown)) to layer 14, if present, or directly to the surface 20 of substrate 12, and is absorbed into layer 14 or substrate 12, leaving a mark, as at 16. The resulting printed product typically has the same or better qualities than many other ink-jet printed products printed with other ink-jet inks that are in commercial use today. Some of the notable characteristics of many of the new ink-jet inks include equivalent or better control of black-to-color bleed, halo, and mottle when printed with a black pigment ink on plain paper. Additionally, there is improved image quality, a decrease in humid hue shift and more satisfactory stacking performance when printed on porous media.

Improved print quality, increased decap time, pen reliability, environmental robustness of ink in pen, and environmental robustness of printed ink on media, are all potentially provided by many of the inks disclosed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The above discussion is meant to be illustrative of the principles and various embodiments of the present invention. Numerous variations and modifications will become apparent to those skilled in the art once the above disclosure is fully appreciated. For example, the nature of the print media may be varied and the type of colorant employed in the ink may each be varied from those identified herein. It is intended that the following claims be interpreted to embrace all such variations and modifications.

What is claimed is:

1. An ink-jet ink comprising:
   an aqueous liquid vehicle;
   at least 1% by weight colorant; and
   a black-to-color bleed control enhancing amount of magnesium sulfate or hydrate thereof;
   wherein said colorant comprises at least one phthalocyanine dye, said phthalocyanine dye being a cyan dye having the structure:

wherein
   M is a hydrogen atom; a metal atom; or an oxide, hydroxide, or halide of the metal atom;
   $P_c$ is a phthalocyanine nucleus;
   $R^1$ and $R^2$ are independently a substituent selected from the group of $—SOX^1$, $—SO_2X^1$, $—SO_2NX^2X^3$, $—SO_3X^4$; where $X^1$, $X^2$, $X^3$, and $X^4$ are independently a hydrogen atom, a substituted or unsubstituted $C_1$ to $C_7$ alkyl group, a substituted or unsubstituted aryl group, or a substituted or unsubstituted heterocyclic group;
   wherein at least one of $R^1$ or $R^2$ has an ionic hydrophilic group as a substituent; and
   k and l are independently an integer ranging from 1 to 3, where the sum of k and l is 4.

2. The ink-jet ink of claim 1, wherein said magnesium sulfate is present in combination with at least one additional black-to-color bleed control agent, said at least one additional black to color bleed control agent includes a multivalent salt.

3. The ink of claim 1, wherein, with respect to the cyan dye:
   $R^1$ is $—SO—(CH_2)_3—SO_3Z$, or $—SO_2—(CH_2)_3—SO_3Z$;
   $R^2$ is $—SO_2—(CH_2)_3—SO_2NH—C_2H_4OC_2H_4OH$, or $—SO_2—(CH_2)_3—SO_2NH—CH_2CH(OH)CH_3$;
   k is from 2 to 3; and
   Z is lithium, sodium, potassium, ammonium, tetramethylammonium, or a mixture thereof.

4. The ink of claim 1, wherein, with respect to the cyan dye:
   $R^1$ is $—SO_2—(CH_2)_3—SO_3Z$;
   $R^2$ is $—SO_2—(CH_2)_3—SO_2NH—CH_2CH(OH)CH_3$;
   k is 3; and
   Z is lithium.

5. The ink-jet ink of claim 1, further comprising an anti-flocculant phenylenediamine compound having the structure:

and salts thereof, wherein M is a monovalent cation.

6. The ink-jet ink according to claim 1, wherein the magnesium sulfate or hydrate thereof includes magnesium sulfate heptahydrate.

7. An ink-jet ink, comprising:
   an aqueous liquid vehicle;
   at least 1% by weight colorant; and
   a black-to-color bleed control enhancing amount of magnesium sulfate or hydrate thereof;
   wherein said colorant comprises at least one azo dye;
   wherein said azo dye comprises:

(a) a magenta dye having the structure:

and salts thereof, wherein
R²¹, R²³, R²⁵, R²⁷, R²⁹, and R³¹, are independently a hydrogen atom or a sulfonate group;

R²² is a hydrogen atom or a nitro group;
R²⁶ and R²⁸ are independently a hydrogen atom or a methyl group;
R²⁴ and R³⁰ are independently a methyl or sulfonate group; and
R³² is a methyl or a methoxy group; and
(b) a second magenta dye having the structure:

and salts thereof, wherein Q is lithium, potassium, sodium, ammonium, tetramethylammonium, or a mixture thereof.

8. The ink-jet ink of claim 7, further comprising an anti-flocculant phenylenediamine compound having the structure:

and salts thereof, wherein M is a monovalent cation.

9. The ink-jet ink according to claim 7, wherein the magnesium sulfate or hydrate thereof includes magnesium sulfate heptahydrate.

10. An ink-jet ink, comprising:
an aqueous liquid vehicle;
at least 1% by weight colorant; and
a black-to-color bleed control enhancing amount of magnesium sulfate or hydrate thereof;
wherein said colorant comprises a yellow dye having the structure:

and salts thereof.

11. The ink-jet ink of claim 10, further comprising an anti-flocculant phenylenediamine compound having the structure:

and salts thereof, wherein M is a monovalent cation.

12. The ink-jet ink according to claim 10, wherein the magnesium sulfate or hydrate thereof includes magnesium sulfate heptahydrate.

13. An ink-jet ink set, comprising:
an ink-jet ink comprising a colorant in an aqueous liquid; and a fixative solution comprising magnesium sulfate or a hydrate thereof in a second aqueous liquid, in the absence of a colorant, said fixative solution being formulated to fix said ink-jet ink when the ink and the fixative solution come in contact with each other;
wherein said colorant comprises at least one phthalocyanine dye, said phthalocyanine dye being a cyan dye having the structure:

$$M-P_c \begin{matrix} (R^1)_k \\ (R^2)_l \end{matrix}$$

wherein

M is a hydrogen atom; a metal atom; or an oxide, hydroxide, or halide of the metal atom;

$P_c$ is a phthalocyanine nucleus;

$R^1$ and $R^2$ are independently a substituent selected from the group of —$SOX^1$, —$SO_2X^1$, —$SO_2NX^2X^3$, —$SO_3X^4$; where $X^1$, $X^2$, $X^3$, and $X^4$ are independently a hydrogen atom, a substituted or unsubstituted $C_1$ to $C_7$ alkyl group, a substituted or unsubstituted aryl group, or a substituted or unsubstituted heterocyclic group;

wherein at least one of $R^1$ or $R^2$ has an ionic hydrophilic group as a substituent; and k and l are independently an integer ranging from 1 to 3, where the sum of k and l is 4.

14. The ink-jet ink set of claim 13, wherein, with respect to the cyan dye:

$R^1$ is —SO—$(CH_2)_3$—$SO_3Z$, or —$SO_2$—$(CH_2)_3$—$SO_3Z$;

$R^2$ is —$SO_2$—$(CH_2)_3$—$SO_2NH$—$C_2H_4OC_2H_4OH$, or —$SO_2$—$(CH_2)_3$—$SO_2NH$—$CH_2CH(OH)CH_3$;

k is from 2 to 3; and

Z is lithium, sodium, potassium, ammonium, tetramethylammonium, or a mixture thereof.

15. The ink-jet ink set of claim 13, wherein, with respect to the cyan dye:

$R^1$ is —$SO_2$—$(CH_2)_3$—$SO_3Z$;

$R^2$ is —$SO_2$—$(CH_2)_3$—$SO_2NH$—$CH_2CH(OH)CH_3$;

k is 3; and

Z is lithium.

16. An ink-jet ink set, comprising:

an ink-jet ink including a colorant and a magnesium sulfate or a hydrate thereof in an aqueous liquid;

wherein said colorant includes at least one phthalocyanine dye, said phthalocyanine dye being a cyan dye having the structure:

$$M-P_c \begin{matrix} (R^1)_k \\ (R^2)_l \end{matrix}$$

wherein

M is a hydrogen atom; a metal atom; or an oxide, hydroxide, or halide of the metal atom;

$P_c$ is a phthalocyanine nucleus;

$R^1$ and $R^2$ are independently a substituent selected from the group of —$SOX^1$, —$SO_2X^1$, —$SO_2NX^2X^3$, —$SO_3X^4$; where $X^1$, $X^{2'}$, $X^3$, and $X^4$ are independently a hydrogen atom, a substituted or unsubstituted $C_1$ to $C_7$ alkyl group, a substituted or unsubstituted aryl group, or a substituted or unsubstituted heterocyclic group;

wherein at least one of $R^1$ or $R^2$ has an ionic hydrophilic group as a substituent; and k and l are independently an integer ranging from 1 to 3, where the sum of k and l is 4.

17. The ink-jet ink set of claim 16, wherein, with respect to the cyan dye:

$R^1$ is —SO—$(CH_2)_3$—$SO_3Z$, or —$SO_2$—$(CH_2)_3$—$SO_3Z$;

$R^2$ is —$SO_2$—$(CH_2)_3$—$SO_2NH$—$C_2H_4OC_2H_4OH$, or —$SO_2$—$(CH_2)_3$—$SO_2NH$—$CH_2CH(OH)CH_3$;

k is from 2 to 3; and

Z is lithium, sodium, potassium, ammonium, tetramethylammonium, or a mixture thereof.

18. The ink-jet ink set of claim 16, wherein, with respect to the cyan dye:

$R^1$ is —$SO_2$—$(CH_2)_3$—$SO_3Z$;

$R^2$ is —$SO_2$—$(CH_2)_3$—$SO_2NH$—$CH_2CH(OH)CH_3$;

k is 3; and

Z is lithium.

19. An ink-jet ink set, comprising:

an ink-jet ink including a colorant and a magnesium sulfate or a hydrate thereof in an aqueous liquid;

wherein said colorant comprises at least one azo dye;

wherein said azo dye includes:

(a) a magenta dye having the structure:

[chemical structure with substituents $R^{21}$, $R^{22}$, $R^{23}$, $R^{24}$, $R^{25}$, $R^{26}$, $R^{27}$, $R^{28}$, $R^{29}$, $R^{30}$, $R^{31}$, $R^{32}$]

and salts thereof, wherein $R^{21}$, $R^{23}$, $R^{25}$, $R^{27}$, $R^{29}$, and $R^{31}$, are independently a hydrogen atom or a sulfonate group;

$R^{22}$ is a hydrogen atom or a nitro group;

$R^{26}$ and $R^{28}$ are independently a hydrogen atom or a methyl group;

$R^{24}$ and $R^{30}$ are independently a methyl or sulfonate group; and

$R^{32}$ is a methyl or a methoxy group; and (b) a second magenta dye having the structure:

[chemical structure showing a fused ring system with $QO_3S$ groups, HN linkage, and $SO_3Q$ substituents]

and salts thereof, wherein Q is lithium, potassium, sodium, ammonium, tetramethylammonium, or a mixture thereof.

20. An ink-jet ink set, comprising:
an ink-jet ink including a colorant and a magnesium sulfate or a hydrate thereof in an aqueous liquid;
wherein said colorant includes a yellow dye having the structure:

and salts thereof.

21. An ink-jet ink set, comprising:
an ink-jet ink including a colorant in an aqueous liquid; and a jettable fixative solution including magnesium sulfate or a hydrate thereof in a second aqueous liquid, in the absence of a colorant, said fixative solution being formulated to fix said ink-jet ink when the ink and the fixative solution come in contact with each other;
wherein said colorant comprises at least one azo dye;
wherein said azo dye comprises:
(a) a magenta dye having the structure:

and salts thereof, wherein
$R^{21}$, $R^{23}$, $R^{25}$, $R^{27}$, $R^{29}$, and $R^{31'}$ are independently a hydrogen atom or a sulfonate group;
$R^{22}$ is a hydrogen atom or a nitro group;
$R^{26}$ and $R^{28}$ are independently a hydrogen atom or a methyl group;
$R^{24}$ and $R^{30}$ are independently a methyl or sulfonate group; and
$R^{32}$ is a methyl or a methoxy group; and
(b) a second magenta dye having the structure:

and salts thereof, wherein Q is lithium, potassium, sodium, ammonium, tetramethylammonium, or a mixture thereof.

22. An ink-jet ink set, comprising:

an ink-jet ink including a colorant in an aqueous liquid; and a jettable fixative solution including magnesium sulfate or a hydrate thereof in a second aqueous liquid, in the absence of a colorant, said fixative solution being formulated to fix said ink-jet ink when the ink and the fixative solution come in contact with each other;

wherein said colorant comprises a yellow dye having the structure:

and salts thereof.

* * * * *

UNITED STATES PATENT AND TRADEMARK OFFICE
CERTIFICATE OF CORRECTION

| | |
|---|---|
| PATENT NO. | : 7,476,270 B2 |
| APPLICATION NO. | : 11/669899 |
| DATED | : January 13, 2009 |
| INVENTOR(S) | : Marlene McGorrin |

Page 1 of 1

It is certified that error appears in the above-identified patent and that said Letters Patent is hereby corrected as shown below:

In column 12, line 39, delete "$R^2$," and insert -- $R^{28}$ --, therefor.

In column 23, line 60, in Claim 16, delete "$X^2$," and insert -- $X^2$ --, therefor.

In column 25, line 52, in Claim 21, delete "$R^{31}$," and insert -- $R^{31}$, --, therefor.

Signed and Sealed this

Fourteenth Day of June, 2011

David J. Kappos
*Director of the United States Patent and Trademark Office*